US010270553B2

(12) United States Patent
Shim et al.

(10) Patent No.: US 10,270,553 B2
(45) Date of Patent: Apr. 23, 2019

(54) TDDD SWITCHING CONTROL APPARATUS OF THE DISTRIBUTED ANTENNA SYSTEM

(71) Applicants: KMW U.S.A., Inc., Fullerton, CA (US); SK Telesys Co., Ltd., Seongnam-si (KR)

(72) Inventors: Joon Hyong Shim, Yongin-si (KR); Jong Ho Park, Yongin-si (KR); Dae Ho Woo, Incheon (KR); Ki Wook Kim, Seoul (KR); Dae Kwang Kim, Yongin-si (KR); Myoung Yong Shin, Seongnam-si (KR); Bung Chul Kim, Glendale, CA (US); Nak Zu E, Fullerton, CA (US); Bo Yong Bae, Irvine, CA (US); Daniel Taeyoon Kim, Cypress, CA (US)

(73) Assignees: KMW U.S.A., Inc., Fullerton, CA (US); SK Telesys Co., Ltd., Seongnam-Si (KR)

( * ) Notice: Subject to any disclaimer, the term of this patent is extended or adjusted under 35 U.S.C. 154(b) by 319 days.

(21) Appl. No.: 15/218,447

(22) Filed: Jul. 25, 2016

(65) Prior Publication Data
US 2017/0207871 A1    Jul. 20, 2017

(30) Foreign Application Priority Data

Jan. 15, 2016  (KR) .................. 10-2016-0005610
Jun. 10, 2016  (KR) .................. 10-2016-0072328

(51) Int. Cl.
*H04J 3/10*  (2006.01)
*H04W 52/24*  (2009.01)
(Continued)

(52) U.S. Cl.
CPC ............. *H04J 3/10* (2013.01); *H04W 52/243* (2013.01); *H04W 52/34* (2013.01); *H04W 56/00* (2013.01)

(58) Field of Classification Search
CPC ....... H04J 3/10; H04W 52/243; H04W 52/34; H04W 56/00
(Continued)

(56) References Cited

U.S. PATENT DOCUMENTS

2007/0291668 A1* 12/2007 Duan ................. H04B 7/15535
                                                   370/280
2009/0207776 A1*  8/2009 Baik ................. H04B 7/15585
                                                   370/315
(Continued)

FOREIGN PATENT DOCUMENTS

KR     2006-0036656 A    5/2006

OTHER PUBLICATIONS

Korean Office Action (in Korean) regarding a related patent application in Korea dated Dec. 28, 2016 ( 4 pages).

*Primary Examiner* — Chi Tang P Cheng
(74) *Attorney, Agent, or Firm* — Harness, Dickey & Pierce, P.L.C.

(57) ABSTRACT

A TDD (Time Division Duplex) switching control apparatus in a DAS (Distributed Antenna System) is provided. The present disclosure in some embodiments provides an apparatus, in a TDD switching control of a distributed antenna system, for transmitting a switching signal by using correlation property between a PSS (Primary Synchronization Signal) and an SSS (Secondary Synchronization Signal) and a property of a matched filter.

12 Claims, 6 Drawing Sheets

(51) Int. Cl.
*H04W 52/34* (2009.01)
*H04W 56/00* (2009.01)

(58) Field of Classification Search
USPC .......................................................... 370/280
See application file for complete search history.

(56) References Cited

U.S. PATENT DOCUMENTS

| 2014/0254580 A1* | 9/2014 | Shim ..................... H04W 56/00 |
| | | 370/342 |
| 2016/0020891 A1* | 1/2016 | Jung ................. H04W 72/0446 |
| | | 370/280 |
| 2016/0134397 A1* | 5/2016 | Kobayashi ............ H04L 5/0035 |
| | | 370/329 |

* cited by examiner

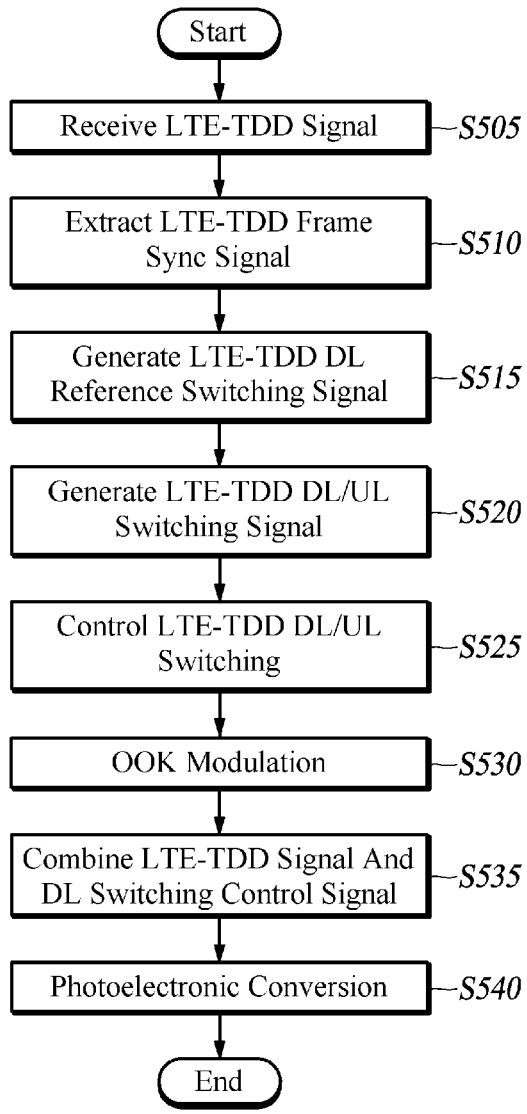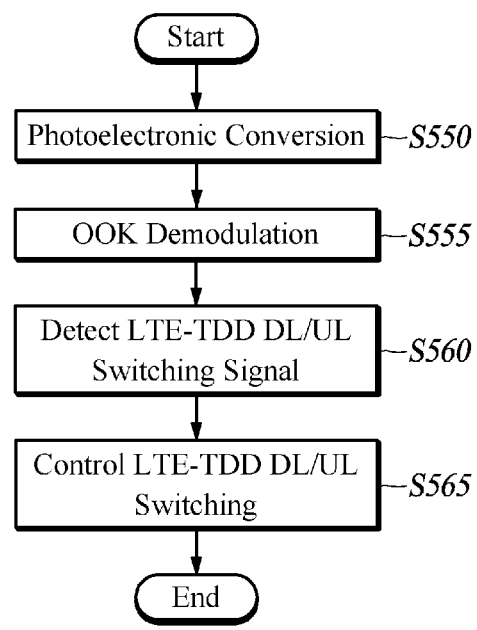
FIG. 5A
FIG. 5B

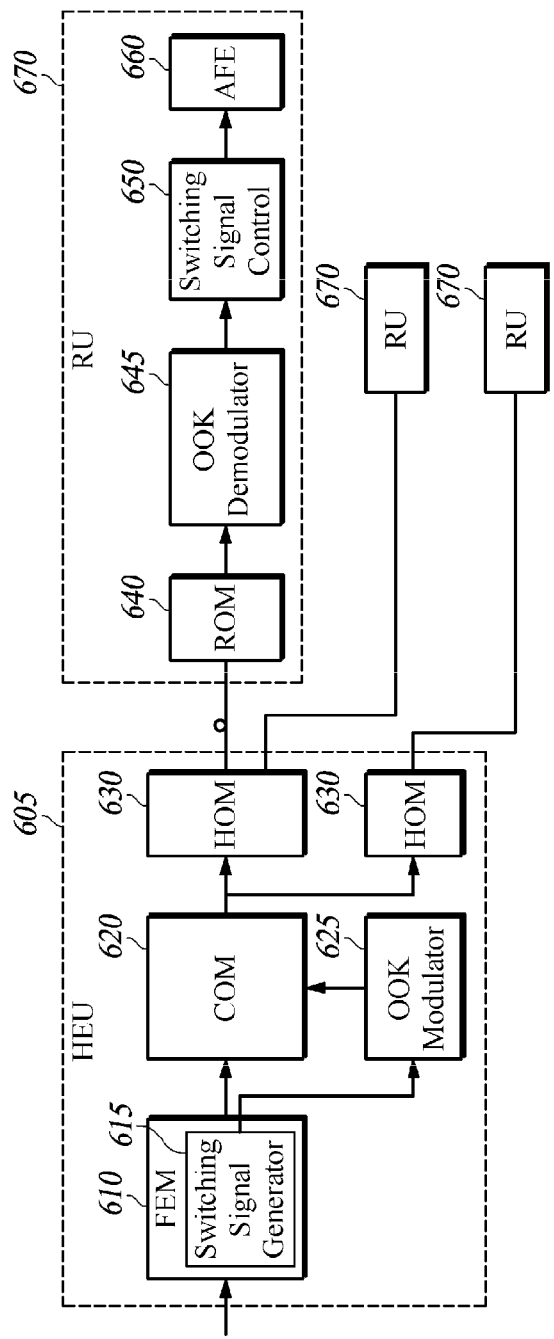
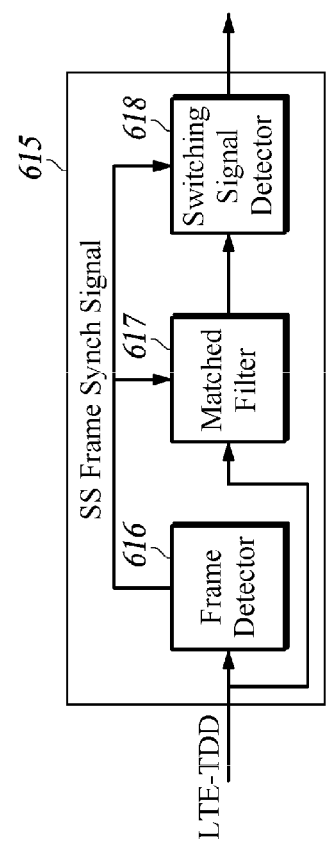
FIG. 6A
FIG. 6B

TDDD SWITCHING CONTROL APPARATUS OF THE DISTRIBUTED ANTENNA SYSTEM

CROSS-REFERENCE TO RELATED APPLICATIONS

The present application is based on, and claims priority from, Korean Patent Application Number 10-2016-0005610, filed Jan. 15, 2016, and Korean Patent Application Number 10-2016-0072328, filed Jun. 10, 2016 the disclosures of which are incorporated by reference herein in their entirety.

TECHNICAL FIELD

Some embodiments of the present disclosure relate to a technology for use in a TDD (Time Division Duplex) switching control apparatus of a distributed antenna system, for detecting and transmitting a TDD switching signal by correlation property between a PSS (Primary Synchronization Signal) and an SSS (Secondary Synchronization Signal).

BACKGROUND

The statements in this section merely provide background information related to the present disclosure and do not necessarily constitute prior art.

In order to cope with the frequency resource depletion and to increase the utility of frequencies, recent mobile communication systems employ a TDD (Time Division Duplex) scheme which utilizes a downlink (DL) band and an uplink (UL) band at the same time. Mobile communication systems employing a TDD include TDD-SCDMA (Time-Division Synchronous CDMA), WIMAX (World Interoperability for Microwave Access), Wibro (Wireless Broadband Internet), TD-LTE (Time Division Long Term Evolution), etc.

The TDD scheme differs from an FDD (Frequency Division Duplex) in that a downlink signal and an uplink signal are temporally separated from each other. Sharing a single frequency band by the downlink and the uplink in the TDD scheme is from a collision between the downlink signal and the uplink signal because both the signals occupies different time slots. Therefore, a TDD scheme distinguishes between the downlink signal and the uplink signal by using a TDD switch, unlike the FDD that utilizes a duplexer.

However, a TDD system which is not provided with TDD switching signals from a base station, requires a separate apparatus for detecting TDD sync signals and for generating TDD switching signals so as to perform a temporal control of a TDD switch.

Typically, a distributed antenna system is composed of a head unit and a remote unit. These units are connected to each other through an optical link. A TDD switch should reside at each of the head unit and the remote unit in order to provide TDD communication services.

The head unit and the remote unit respectively detect a TDD sync signal and generate a control signal to control a downlink signal and an uplink signal.

For detecting TDD sync signals, a radio frequency (RF) power detection method has been used. The RF power detection method is to detect the sync signals by determining the presence or absence of RF power of a downlink signal. As for LTE signals, sync signals are contained in an SS (Special Switching) subframe within a frame. However, such a TDD sync signal detection method has suffered from low reliability since it performs switching operations simply based on the presence of an RF power.

SUMMARY

According to some embodiments of the present disclosure, an apparatus for transmitting a TDD (Time Division Duplex) switching signal for use with a DAS (Distributed Antenna System) is provided, including an FEM (Front-End Module), a Tsync detector, a switching signal generator, an OOK (On-Off Keying) modulator, a combiner and a photoelectric conversion unit. The FEM is configured to receive an input signal from a base station and perform noise-filtering of the input signal, to adjust a power level of a filtered input signal, and to generate a power level-adjusted signal. The Tsync detector is configured to detect a synchronization signal from the power level-adjusted signal. The switching signal generator is configured to generate a DL/UL (Down Link/Up Link) switching signal by using the power level-adjusted signal and the synchronization signal. The OOK modulator is configured to output a modulated analog signal upon receiving the DL/UL switching signal. The combiner is configured to generate a combined signal by combining the adjusted signal with the modulated analog signal. And the photoelectric conversion unit is configured to convert the combined signal into an optical signal.

According to another embodiment of the present disclosure, an apparatus for converting a TDD (Time Division Duplex) switching signal in a DAS (Distributed Antenna System) is provided, including a photoelectric conversion unit, an OOK (On-Off Keying) demodulator, a switching signal delay control unit and a radio frequency (RF) unit. The photoelectric conversion unit is configured to receive an optical signal from a TDD switching signal transmitting apparatus and convert the optical signal into an electric signal. The OOK demodulator is configured to receive the electric signal and to output a demodulated digital signal. The switching signal delay control unit is configured to generate a DL/UL (Down Link/Up Link) switching signal by applying a delay time control on the demodulated digital signal. The RF unit is configured to process a DL signal or a UL signal by using the DL/UL switching signal.

According to yet another embodiment of the present disclosure, a method, performed by a TDD (Time Division Duplex) switching signal transmitting apparatus, is provided for transmitting the TDD switching signal for use with a DAS (Distributed Antenna System) in order to transmit an input signal from a base station, including receiving the input signal from the base station and performing noise-filtering of the input signal, adjusting a power level of a filtered input signal, and generating a power level-adjusted signal, detecting a synchronization signal from the power level-adjusted signal, generating a DL/UL (Down Link/Up Link) switching signal by using the power level-adjusted signal and the synchronization signal, generating a modulated analog signal upon receiving the DL/UL switching signal, generating a combined signal by combining the power level-adjusted signal with the modulated analog signal, and converting the combined signal into an optical signal.

According to yet another embodiment of the present disclosure, a method, performed by a TDD (Time Division Duplex) switching signal comverting appapratus, is provided for converting a switching signal for use with a DAS (Distributed Antenna System), including performing an electric signal conversion comprising receiving an optical signal from a TDD switching signal transmitting apparatus and converting the optical signal into an electric signal, receiving the electric signal and ouputting a demodulated digital signal, generating a DL/UL (Down Link/Up Link) switching signal by applying a delay time control on the demodulated digital signal, and processing a DL signal or a UL signal by using the DL/UL switching signal.

BRIEF DESCRIPTION OF THE DRAWINGS

FIG. 5A is a flowchart of operating characteristics of a DAS for detecting a TDD sync signal in a HEU (Head-End Unit) according to at least one embodiment of the present disclosure.

FIG. 5B is a flowchart of operating characteristics of a DAS for detecting a TDD sync signal in an RU (Remote Unit) according to at least one embodiment of the present disclosure.

FIG. 6A is a diagram of a configuration of a DAS for detecting a TDD sync signal, which is implemented by a COM (Head-End Combining Module) according to at least one embodiment of the present disclosure.

FIG. 6B is a diagram of a circuit for detecting a TDD sync signal, according to at least one embodiment of the present disclosure.

DETAILED DESCRIPTION

Exemplary embodiments of the present disclosure are described below with reference to the accompanying drawings.

Although exemplary embodiments of the present disclosure will be described for illustrative purposes, those skilled in the art will appreciate that various modifications, additions and substitutions are possible, without departing from the idea and scope of the claimed disclosure. Accordingly, one of ordinary skill would understand the scope of the claimed disclosure is not to be limited by the explicitly described embodiments herein but by the claims and equivalents thereof, and all the equivalent technical ideas thereto should be construed as included in the scope of the disclosed embodiments.

The present disclosure in some embodiments is directed to a TDD switching control of a distributed antenna system, and provides an apparatus for transmitting a switching signal by using correlation property between a PSS (Primary Synchronization Signal) and an SSS (Secondary Synchronization Signal) and a property of a matched filter.

Figure 1:
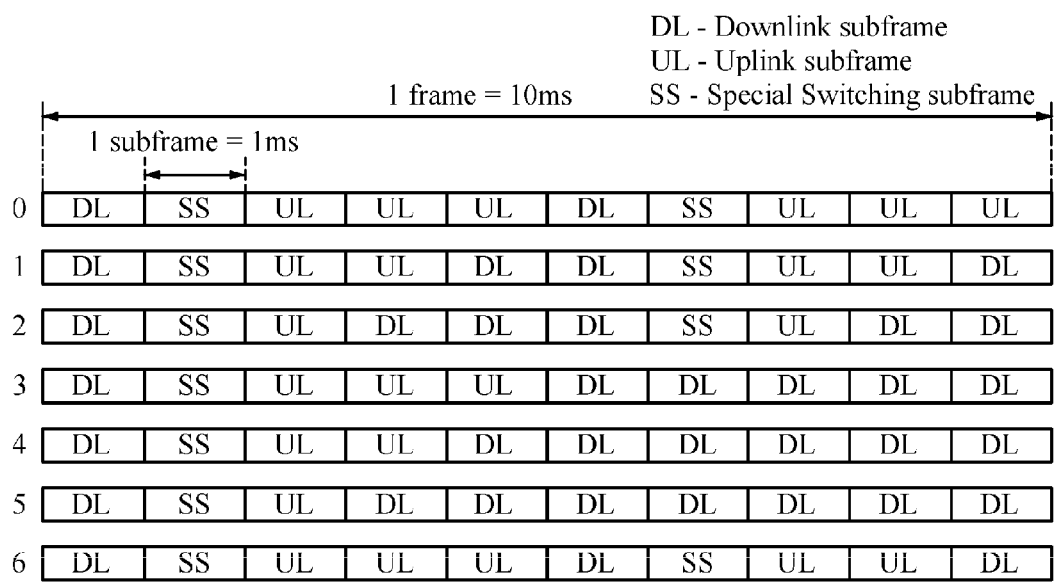
FIG. 1 is a diagram of an architecture of an SS (Special Switching) subframe in LTE-TDD, according to at least one embodiment of the present disclosure.

FIG. 1 is a diagram of an architecture of a special switching subframe in LTE-TDD, according to at least one embodiment of the present disclosure. FIG. 1 illustrates example divisions of the special switching subframe for use in a DL/UL division method. The respective configurations of the special switching subframe have different DL/UL ratios depending on the service requirements of the mobile carrier. For example, in case of a frame configuration 0, the DL/UL ratio is 2:6, and a frame configuration 5 has the DL/UL ratio of 8:1. The first subframe always uses DL, and the third subframe always uses UL. Switching DL over to UL requires a special switching subframe SS. On the other hand, switching UL to DL requires no special switching subframe. Since the DL is always used as the first subframe and the UL is always used as the third subframe, a special subframe SS is always inserted as the second subframe.

As shown in FIG. 1, UL and DL transmissions are switched over with a time lag, and therefore the respective UL and DL transmissions cannot be continuous in time domain. The switching involves a hardware time delay and a compensation therefor is required. To compensate for the delay, a guard period (GP) is allocated between the UL and the DL.

Figure 2:
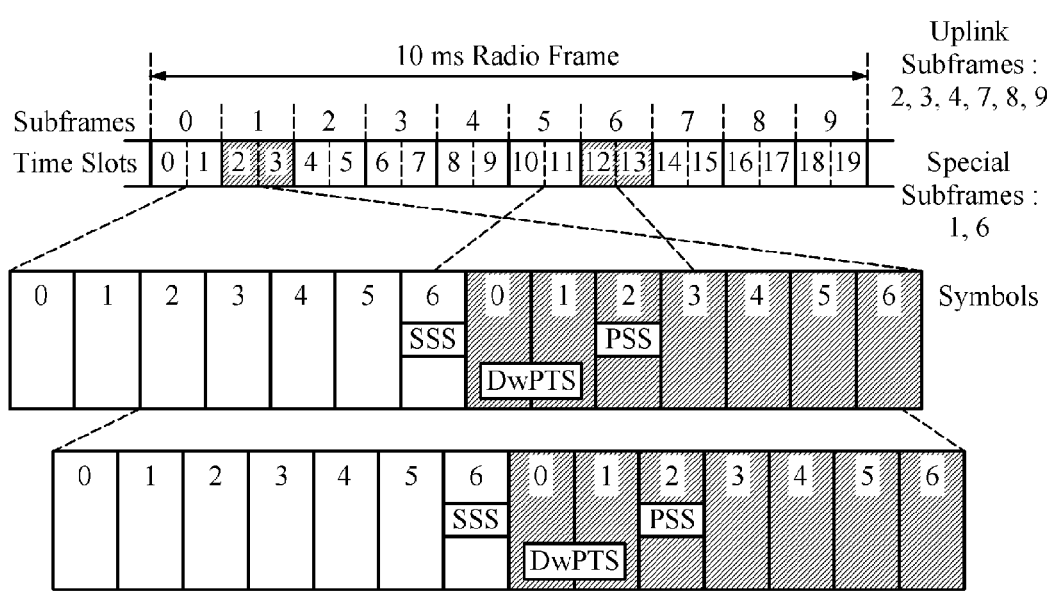
FIG. 2 is a timing diagram of a TDD sync signal, according to at least one embodiment of the present disclosure.

FIG. 2 is a timing diagram of a TDD sync signal, according to at least one embodiment of the present disclosure. FIG. 2 shows the timing of the TDD PSS (Primary Synchronization Signal) and SSS (Secondary Synchronization Signal). FIG. 2 illustrates a normal cyclic prefix of configuration 0 among the configurations of the special switching subframe illustrated in FIG. 1. Referring to FIG. 2, a plurality of symbols may be included in one subframe as well as one slot. In a normal cyclic prefix, a slot may be composed of seven symbols. In an extended cyclic prefix, a slot may be composed of six symbols. Here, the symbol may refer to an orthogonal frequency division multiplexing (OFDM) symbol.

In a TDD communications system, PSS may be included in the third symbol of slot 2 in subframe 1 and included in the third symbol of slot 12 in subframe 6. PSS is transmitted in units of 5 ms, which enables a time synchronization with the base station. In addition, based on the time when the PSS is detected, multiple subframes or multiple slots can be respectively distinguished.

Referring to FIG. 2, in a TDD communication system, SSS may be included in the last symbol of slot 1 in subframe 0 and included in the last symbol of slot 11 in subframe 5. In this case, both subframe 0 and subframe 5 may be subframes for downlink.

In case of TDD, the PSS and the SSS are not adjacent symbols. Time slots 2 and 12 respectively have the first two symbols dedicated to a PCFICH (Physical Control Format Indicator Channel) and a PDCCH (Physical Downlink Control Channel).

Figure 3:
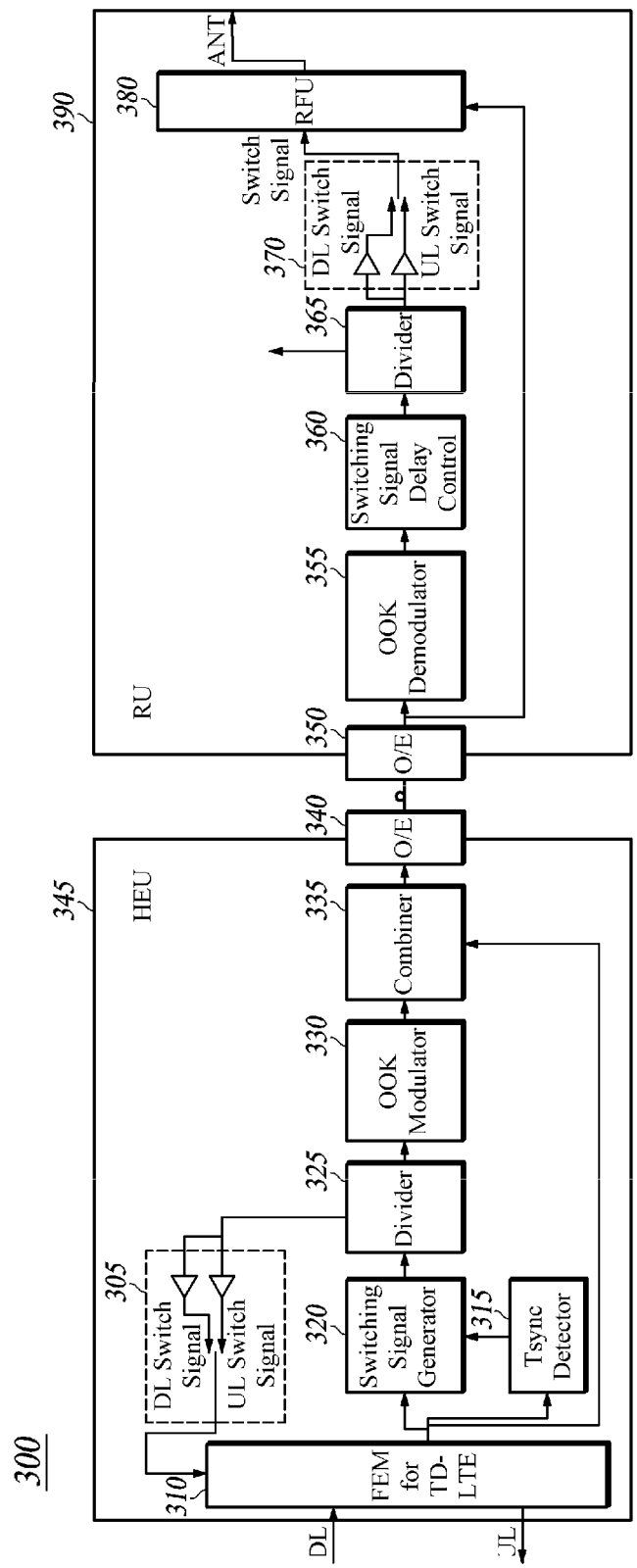
FIG. 3 is a diagram of a configuration of a DAS for detecting a TDD sync signal in a SISO (Signal Input Single Output) architecture according to at least one embodiment of the present disclosure.

FIG. 3 is a diagram of a configuration of a DAS 300 for detecting a TDD sync signal in a SISO (Signal Input Single Output) architecture according to at least one embodiment of the present disclosure. Referring to FIG. 3, a TDD supporting equipment of the DAS 300 is configured to include an HEU 345 and an RU 390.

Still referring to FIG. 3, in order to transmit signals received from the LTE-TDD base station to the terminal, the TDD supporting equipment performs the following operation. The TDD supporting equipment exchanges analog signals with the base station. An appropriate switching control of the DL/UL signals is necessary for normal transmission and reception of signals received from the base station. In order for a switching signal to be generated, a frame sync and TDD switching signal needs to be generated from the TDD signal. Once generated, the frame sync and TDD switching signal is used as a signal for controlling the switching of the TDD-based radio base station interface module. The HEU 345 and the RU 390 can exchange signals based on an analog optical communication scheme. The present embodiment discloses a method for generating a switching signal from a TDD signal, a DL/UL signal control method, and a remote transfer method.

Referring to FIG. 3, the HEU 345 includes a FEM (Front-End Module) 310, a DL/UL switching signal unit 305, a Tsync detector 315, a switching signal generator 320, a divider 325, an OOK (On-Off Keying) modulator 330, a combiner 335 and a photoelectric converter 340.

The FEM 310 receives an input signal from the base station and performs noise-filtering of the input signal, and adjust the power level of the filtered signal to meet the requirements of DAS. The signal adjusted by the FEM 310 is transmitted to the switching signal generator 320, Tsync detector 315 and combiner 335.

The Tsync detector 315 receives the adjusted signal to detect a synchronization signal. The detected signal is sent to the switching signal generator 320.

The switching signal generator 320 generates a reference switching signal by using the adjusted signal and the detected synchronization signal. The reference switching signal is transmitted to the divider 325 and then to the DL/UL switching signal unit 305 and the OOK modulator 330.

The divider 325 receives the reference switching signal and distributes the same to the DL/UL switching signal unit 305 and the OOK modulator 330.

The OOK modulator 330 modulates the signal that is sent from the divider 325. The modulation utilizes a method of assigning one of the two digital states to whether the carrier is either transmitted or non-transmitted. An example method is to represent a section wherein a carrier wave is transmitted by 1 and to represent a section wherein a carrier wave is not transmitted by 0. The signal from the divider 325 is modulated by the OOK modulator 330 into an analog signal having a 100 MHz carrier.

The combiner 335 generates a combined signal by combining the adjusted signal with the analog signal from the OOK modulator 330. The combined signal is transmitted to the photoelectric converter 340.

The photoelectric converter 340 converts the combined signal into an optical signal, and transmits the optical signal to the RU 390 by way of an optical link.

The RU 390 includes a photoelectric converter 350, an OOK demodulator 355, a switching signal delay control unit 360, a divider 365 and an RF unit 380.

The photoelectric converter 350 converts an optical signal transmitted from the HEU 345 into an electrical signal. The converted electrical signal is processed by the OOK demodulator 355 to generate a demodulated digital signal.

The switching signal delay control unit 360 applies a delay time control to the demodulated digital signal from the OOK demodulator 355, in order to compensate for a hardware delay, and finally generates a switching signal for DL or UL.

The divider 365 distributes, to a DL/UL switching signal unit 370, the switching signal generated under the delay time control performed by the switching signal delay control unit 360.

The RF unit 380, in response to the DL/UL switching signal, transmits a DL or UL signal. The RF unit 380 sends the DL signal via an antenna to the terminal, and transmits the UL signal to the base station.

The FEM 310 is linked to a base station, and transmits and receives the DL or UL signals. The DL signal from the FEM 310 is input to the Tsync detector 315, the switching signal generator 320 and the combiner 335. Tsync detector 315 detects the sync signal that corresponds to an LTE frame.

The switching signal generator 320 generates a TDD switching signal. The divider 325 receives the TDD switching signal and distribute the same to the DL/UL switching signal unit 305 and the OOK modulator 330. The OOK modulator 330 processes the TDD switching signal to generate a modulated analog signal having a 100 MHz carrier wave. A modulated analog signal from the OOK modulator 330, after being combined with the output signal of the FEM 310, undergoes a photoelectric conversion and the converted signal is transmitted to the RU 390. The OOK demodulator 355 in the RU 390 detects a switching signal. The switching signal delay control unit 360 applies a delay time control to the detected signal, and generates a switching signal. Utilizing the switching signal, the RF unit 380 transmits the DL or UL signal. Here, the delay time control refers to a control operation performed by the switching signal delay control unit 360 to compensate for a hardware delay in the OOK demodulator 355 or for a multipath delay of the DL signal.

Figure 4A:
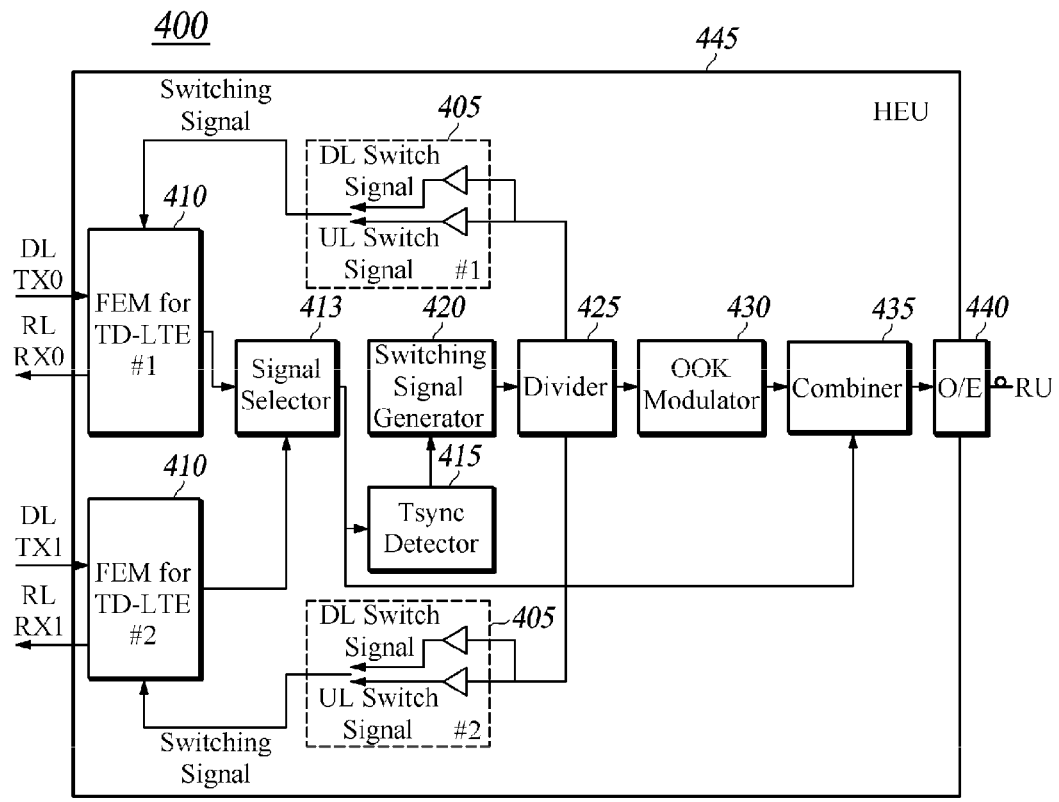
FIGS. 4A and 4B are diagrams of a configuration of a DAS for detecting a TDD sync signal in a MIMO (Multi Input Multi Output) architecture according to at least one embodiment of the present disclosure.
Figure 4B:
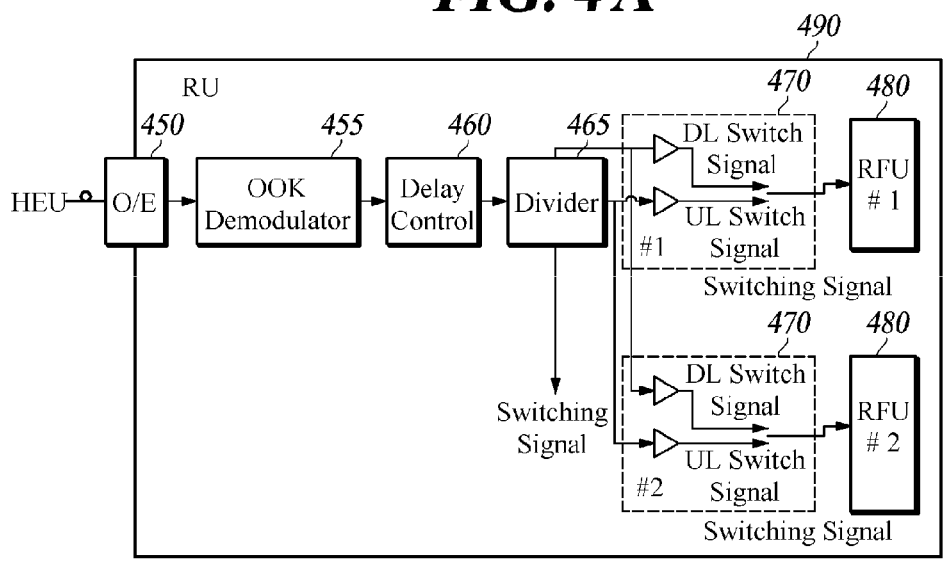

FIGS. 4A and 4B illustrate a configuration of a DAS that performs a TDD synchronization detection in a MIMO (Multi Input Multi Output) architecture according to at least one embodiment of the present disclosure. Unlike the SISO architecture, the MIMO architecture has a signal selector 413 configured to select one of two TX0 and TX1 signals by analyzing their signal qualities. The operation of the MIMO architecture after the selection of either TX0 or TX1, is substantially the same as that of the SISO architecture.

As shown in FIG. 4A, HEU 445 includes FEMs (Front-end Modules) 410, DL/UL switching signal units 405, a signal selector 413, a Tsync detector 415, a switching-signal generator 420, a divider 425, an OOK modulator 430 and a photoelectric converting unit 440.

The first and the second FEMs 410 receive signals inputted from the base station, perform noise-filtering of the received signals, and adjust the power level of filtered signals with a view to satisfy the requirement of DAS. The adjusted signal adjusted by the first or the second FEM 410 is transmitted to the signal selector 413 and the Tsync detector 415.

The signal selector 413 receives the adjusted signals and analyzes the qualities of the adjusted signals in order to select one of the two adjusted signals. The selected adjusted signal is transmitted to the Tsync detector 415 and the switching-signal generator 420.

The Tsync detector 415 detects a synchronization signal from the adjusted signal that is selected by the signal selector 413. The detected synchronization signal is sent to the switching-signal generator 420.

The switching-signal generator 420 generates a reference switching signal by using the adjusted signal selected by the signal selector 413 and the synchronization signal detected by the Tsync detector 415. The reference switching signal is transferred via the divider 425 to the first and second DL/UL switching signal units 405 and the OOK modulator 430.

The divider 425 receives the reference switching signal and distributes the received signal to the first and the second DL/UL switching signal units 405 and the OOK modulator 430.

The OOK modulator 430 modulates the signals that passed through the divider 425. The modulation is performed in a manner that either of the two digital states respectively corresponds to a transmission or a non-transmission of carrier. For example, a time period with carrier transmission is represented by 1 and a time period without carrier transmission is represented by 0. The signal that passed through the divider 425 is processed by the OOK modulator 430 to generate a modulated analog signal having a 100 MHz carrier.

A combiner 435 is connected to combine the adjusted signal selected by the signal selector 413 with the modulated analog signal from the OOK modulator 430 to generate a combined signal which is then transmitted to the photoelectric converter 440.

The photoelectric converter 440 first converts the combined signal into an optical signal, and transmits the optical signal via an optical link to the RU 490.

The RU 490 includes a photoelectric converter 450, an OOK demodulator 455, a switching signal delay control unit 460, a divider 465, a first and a second DL/UL switching signal unit 470, and a first and a second RFU 480.

The photoelectric converter 450 converts an optical signal transmitted from the HEU 445 into an electric signal. The converted electrical signal is processed by the OOK demodulator 455 to generate a demodulated digital signal.

The switching signal delay control unit 460 applies a delay time control to the demodulated digital signal from the OOK demodulator 455 to generate a switching signal for DL or UL.

The divider 465 distributes the switching signal generated by the switching signal delay control unit 460 to the first or the second DL/UL switching signal unit 470.

The first and the second RF unit 480 transmits the DL or UL signal by using the DL/UL switching signal. The first and the second RF unit 480 transmits the DL signal via an antenna to a terminal, and transmits the UL signal to the base station.

FIG. 5A is a flowchart of the operation of a DAS for detecting a TDD sync signal in a HEU according to at least one embodiment of the present disclosure. The operation of the DAS for detecting the TDD synchronization signal is described below.

At least one FEM (310, 410) receives an LTE-TDD signal (Step S505). The FEM (310, 410) performs noise-filtering of the received signal, adjusts the power level of the filtered signal to meet the requirements of the DAS.

The Tsync detector (315, 415) extracts an LTE-TDD frame synchronization signal from the LTE-TDD signal (S510).

The switching signal generator (320, 420) generates an LTE-TDD DL reference switching signal (S515). The switching signal generator (320, 420) generates the LTE-TDD DL reference switching signal based on the adjusted filtered signal and the detected synchronization signal.

The switching signal generator (320, 420) generates a LTE-TDD DL/UL switching signal from the LTE-TDD DL standard switching signal (S520).

At least one DL/UL switching signal unit (305, 405) controls the DL or UL switching by using the LTE-TDD DL/UL switching signal (S525). The DL/UL switching signal unit (305, 405) performs the DL or UL switching control by using the LTE-TDD DL/UL switching signal distributed by the divider (325, 425).

The OOK modulator (330, 430) modulates the DL or UL switching control signal (S530). The modulation utilizes a method of assigning one of the two digital states to the amplitude of the carrier.

The combiner (335, 435) combines the modulated LTE-TDD DL switching control signal with the LTE-TDD signal (S535).

The photoelectric converter (340, 440) converts the combined signal to an optical counterpart (S540).

FIG. 5B is a flowchart of the operation of a DAS for detecting a TDD sync signal in an RU according to at least one embodiment of the present disclosure. The photoelectrically converted optical signal is transmitted to the RU via an optical link.

The photoelectric converter (350, 450) converts the optical signal transmitted to the RU into an electric signal (S550).

The OOK demodulator (355, 455) processes the converted electrical signal to generate a demodulated digital signal (S555).

The switching signal delay control unit (360, 460) detects the LTE-TDD DL/UL switching signal from the demodulated digital signal (S560). The switching signal delay control unit (360, 460) detects the LTE-TDD DL/UL switching signal by applying a delay time control on the demodulated digital signal.

The switching signal delay control unit (360, 460) adjusts the detected LTE-TDD DL/UL switching signal by applying a delay control thereon and generates the LTE-TDD DL/UL switching signal (S565).

FIG. 6A is a diagram of a configuration of a DAS for detecting a TDD sync signal, which is implemented by a COM according to at least one embodiment of the present disclosure. The DAS includes an HEU 605 and an RU 670. The HEU 605 includes an FEM 610, a COM 620, an OOK modulator 625 and an HOM (Head-end Optic Module) 630. The RU 670 includes an ROM (Remote Optic Module) 640, an OOK demodulator 645, a switching signal control unit 650 and an AFE (Analog Front-end) unit 660.

The FEM 610 receives an input signal from the base station and performs noise-filtering of the received input signal, and adjusts the power level of the filtered signal to meet the requirements of DAS and transmits the adjusted signal to the COM 620. The FEM 610 includes a switching signal generator 615. The switching signal generator 615 generates a switching signal and transmits the same to the OOK modulator 625.

The COM 620 combines the adjusted signal from the FEM 610 with a modulated switching signal from the OOK modulator 625, and transmits the combined signal to the HOM 630. The COM 620 adjusts its attenuation value for downlink in order to adjust the rate at which signals from a plurality of base stations occupy in the same frequency band at the output of RU 670. The COM 620 then adjusts an uplink attenuation value by using the same attenuation value as applied to downlink.

The OOK modulator 625 modulates the switching signal generated by the switching signal generator 615. For example, the switching signal modulation may utilize a method for representing a section wherein a carrier is transmitted by 1 and representing a section without a carrier transmission by 0. In other words, the switching signal is processed by the OOK modulator 625 to generate a modulated analog signal having a 100 MHz carrier wave.

After converting the combined signal into an optical signal, the HOM 630 transmits the optical signal to an optical link and then to the RU 670.

The ROM 640 converts the optical signal transmitted from the HEU 610 into an electric signal. The electric signal converted by the ROM 640 is then processed by the OOK demodulator 645 to generate a demodulated digital signal which is transmitted to the switching signal control unit 650.

The switching signal control unit 650 generates a DL/UL switching signal by applying a delay time control on the demodulated digital signal from the OOK demodulator 645.

The AFE unit 660 processes the DL or UL switching signal that was generated under the delay time control by the switching signal control unit 650. The DL signal is transmitted to a terminal via an antenna, and the UL signal is transmitted to the base station.

FIG. 6B shows a circuit for detecting the TDD synchronization signal according to at least one embodiment of the present disclosure. The circuitry for detecting the TDD synchronization signal includes a frame detector 616, a matched filter 617 and a switching signal detector 618.

The frame detector 616 detects the start position of a special subframe in order to detect a sync signal from the LTE-TDD signal. The special subframe includes a DwPTS (Downlink Pilot Time Slot), a GP (Guard Period), and an UpPTS (Uplink Pilot Time Slot), wherein the DwPTS is assigned a PSS (Primary Synchronization Signal). The frame detector 616 detects the start position of the special subframe by using correlation property of the PSS, and thereby generates a special subframe sync signal.

Upon receiving an input of the special subframe sync signal and the LTE-TDD signal, the matched filter 617 generates the corresponding output. A matched filter is adapted to have a filter factor matched to a known input signal characteristic so that the filter exhibits a maximum output value in response to a particular signal input. The matched filter 617 has its impedance matched to the adjusted signal by the FEM 610 and to the special subframe sync signal, and therefore the matched filter 617 can provide a maximum output upon receiving the input of the sync signal.

The switching signal detector 618 generates a DL/UL switching signal by using the frame sync signal and the output value of the matched filter 617.

The conventional TDD sync signal detector requires switching signal synchronization modules to be included in an HEU and a sub-RU, respectively. For example, if there are N (natural number) HEUs and M (natural number) RUs, a conventional detector requires a total of N+M switching signal synchronization modules. Whereas, the TDD sync signal detector according to at least one embodiment of the present disclosure needs the HEU to include N switching signal synchronization modules without requiring the RU to include a separate module because the RU can restore the switching signal transmitted from the HEU and use the same. Hence, N switching signal synchronization modules are sufficient to the TDD sync signal detector according to at least one embodiment of the present disclosure, which results in simplified installations and reduced cost compared to prior art apparatuses.

In some embodiments of the present disclosure, a TDD switching control apparatus can provide upstream and downstream switching functionality by performing, from a signal generated by a switching signal generator, a delay time control in each of HEU and RU units. In addition, a signal that is detected in downstream mode may also be used for application to upstream mode, and therefore switching signal synchronization modules need not be present respectively in the HEU and RU units. Then, the switching signal synchronization module needs to be only in the HEU unit, which saves production cost on top of the switching efficiency.

Although exemplary embodiments of the present disclosure have been described for illustrative purposes, those skilled in the art will appreciate that various modifications, additions and substitutions are possible, without departing from the various characteristics of the disclosure. Therefore, exemplary embodiments of the present disclosure have been described for the sake of brevity and clarity. Accordingly, one of ordinary skill would understand the scope of the disclosure is not limited by the explicitly described above embodiments but by the claims and equivalents thereof.

What is claimed is:

1. A distributed antenna system in which a head-end unit shares a TDD (Time Division Duplex) switching signal with a plurality of remote units, the distributed antenna system comprising:
   the head-end unit comprising:
       an FEM (Front-End Module) configured to receive an input signal from a base station and perform noise-filtering of the input signal, to adjust a power level of the input signal, and to generate a power level-adjusted signal from the input signal;
       a Tsync detector configured to detect a synchronization signal from the power level-adjusted signal;
       a switching signal generator configured to generate a DL/UL (Down Link/Up Link) switching signal by using the power level-adjusted signal and the synchronization signal;
       an OOK (On-Off Keying) modulator configured to modulate a carrier signal based on the DL/UL switching signal and to thereby generate an OOK-modulated analog signal;
       a combiner configured to generate a combined signal by combining the power level-adjusted signal with the OOK-modulated analog signal; and
       a photoelectric conversion unit configured to convert the combined signal into an optical signal, and
   a plurality of remote units, connected to the head-end unit via optical fibers, each comprising:
       a photoelectric conversion unit configured to convert the optical signal into an electric signal to thereby generate the combined signal;
       an OOK (On-Off Keying) demodulator configured to demodulate the combined signal to thereby generate the DL/UL switching signal;
       a switching signal delay control unit configured to apply a delay to the DL/UL switching signal for compensating a hardware delay and to thereby output compensated DL/UL switching signal; and
       a radio frequency (RF) unit configured to transmit a DL signal or a UL signal by using the compensated DL/UL switching signal.

2. The distributed antenna system of claim 1, wherein the switching signal generator comprises:
   a frame detector configured to generate a special subframe sync signal by detecting a starting position of a special subframe from the power level-adjusted signal and the synchronization signal;
   a matched filter configured to generate a matched signal upon receiving an input of the power level-adjusted signal and the special subframe sync signal; and
   a switching signal detector configured to detect the DL/UL switching signal from the matched signal and the special subframe sync signal.

3. The distributed antenna system of claim 2, wherein the special subframe comprises a DwPTS (Downlink Pilot Time Slot), a GP (Guard Period) and an UpPTS (Uplink Pilot Time Slot), and
   wherein the frame detector is configured to detect the starting position of the special subframe based on a PSS (Primary Synchronization Signal) contained in the DwPTS.

4. The distributed antenna system of claim 2, wherein the matched filter is configured to have a filter factor matched to the special subframe sync signal, and to generate a maximum output value of the matched signal in response to an input of the special subframe sync signal.

5. The distributed antenna system of claim 1, configured to support a MIMO (Multi-Input Multi-Output) scheme.

6. The distributed antenna system of claim 5, further comprising a signal selector configured to select a signal among signals from a plurality of base stations by analyzing qualities of the signals in order to support the MIMO scheme.

7. A method, in a distributed antenna system, for sharing a TDD (Time Division Duplex) switching signal between a head-end unit and a plurality of remote units, the method comprising:

by the head-end unit, receiving the input signal from the base station and performing noise-filtering of the input signal, adjusting a power level of the input signal, and generating a power level-adjusted signal from the input signal;

by the head-end unit, detecting a synchronization signal from the power level-adjusted signal;

by the head-end unit, generating a DL/UL (Down Link/Up Link) switching signal by using the power level-adjusted signal and the synchronization signal;

by the head-end unit, generating an OOK-modulated analog signal by modulating a carrier signal based on the DL/UL switching signal;

by the head-end unit, generating a combined signal by combining the power level-adjusted signal with the OOK-modulated analog signal;

by the head-end unit, converting the combined signal into an optical signal, by each of the plurality of remote units, converting the optical signal into an electric signal to generate the combined signal;

by each of the plurality of remote units, demodulating the combined signal to generate the DL/UL switching signal;

by each of the plurality of remote units, applying a delay to the DL/UL switching signal for compensating a hardware delay and thereby outputting a compensated DL/UL switching signal; and by each of the plurality of remote units, transmitting a DL signal or a UL signal by using the compensated DL/UL switching signal.

8. The method of claim 7, wherein the generating of the DL/UL switching signal switching signal comprises:

generating a special subframe sync signal comprising:

detecting a starting position of a special subframe from the power level-adjusted signal and the synchronization signal;

generating a matched signal upon receiving an input of the power level-adjusted signal and the special subframe sync signal; and detecting the DL/UL switching signal from the matched signal and the special subframe sync signal.

9. The method of claim 8, wherein the special subframe comprises a DwPTS (Downlink Pilot Time Slot), a GP (Guard Period) and an UpPTS (Uplink Pilot Time Slot), and wherein the generating of the special subframe sync signal comprises detecting the starting position of the special subframe based on a PSS (Primary Synchronization Signal) contained in the DwPTS.

10. The method of claim 8, wherein the generating of the matched signal have a filter factor matched to the special subframe sync signal, and comprises generating a maximum output value of the matched signal in response to an input of the special subframe sync signal.

11. The method of claim 7, supporting a MIMO (Multi-Input Multi-Output) scheme.

12. The method of claim 11, further comprising selecting a signal among signals from a plurality of base stations by analyzing qualities of the signals in order to support the MIMO scheme.

* * * * *